(12) United States Patent
Sato

(10) Patent No.: US 7,979,481 B2
(45) Date of Patent: Jul. 12, 2011

(54) RANDOM NUMBER GENERATING CIRCUIT

(75) Inventor: Yutaka Sato, Chiba (JP)

(73) Assignee: Seiko Instruments Inc., Chiba-Shi, Chiba (JP)

( * ) Notice: Subject to any disclaimer, the term of this patent is extended or adjusted under 35 U.S.C. 154(b) by 994 days.

(21) Appl. No.: 11/842,544

(22) Filed: Aug. 21, 2007

(65) Prior Publication Data

US 2008/0309401 A1    Dec. 18, 2008

(30) Foreign Application Priority Data

Aug. 25, 2006   (JP) ................. 2006-228975

(51) Int. Cl.
*G06F 1/02* (2006.01)
*G06F 7/58* (2006.01)
(52) U.S. Cl. ................... 708/250; 708/251; 708/255
(58) Field of Classification Search .......... 708/250–256; 714/728, 739
See application file for complete search history.

(56) References Cited

U.S. PATENT DOCUMENTS

| | | | | |
|---|---|---|---|---|
| 6,571,263 | B1 * | 5/2003 | Nagai ................ | 708/3 |
| 7,007,060 | B2 * | 2/2006 | Miller, Jr. .............. | 708/801 |
| 7,243,117 | B2 * | 7/2007 | Yamamoto et al. ......... | 708/250 |
| 7,401,108 | B2 * | 7/2008 | Miller, Jr. .............. | 708/250 |

FOREIGN PATENT DOCUMENTS

| JP | 2001-175458 A | | 6/2001 |
|---|---|---|---|
| JP | 2001175458 A | * | 6/2001 |

OTHER PUBLICATIONS

Wee, Keng Hoong; Shibata, Tadashi; Ohmi, Tadahiro; "A Simple Random Noise Generator Employing Metal-Oxide-Semiconductor-Field-Effect-Transistor Channel kT/C Noise and Low-Capacitance Loading Buffer", Japanese Journal of Applied Physics, vol. 40, Issue 7, pp. 4501-4507, 2001.*
Ali Tangel and Kyusun Choi, "The CMOS Inverter as a Comparator in ADC Designs", Analog Integrated Circuits and Signal Processing, vol. 39, Issue 2, pp. 147-155, May 2004.*

* cited by examiner

*Primary Examiner* — Lewis A Bullock, Jr.
*Assistant Examiner* — Matthew Sandifer
(74) *Attorney, Agent, or Firm* — Brinks Hofer Gilson & Lione

(57) ABSTRACT

Provided is a random number generating circuit having a simple circuit structure, for generating a physical random number based on a noise. The random number generating circuit includes a reference voltage section, an inverting amplifier section having a threshold voltage equal to a reference voltage level, and a semiconductor switch provided between an output terminal of the reference voltage section and an input terminal of the inverting amplifier section. A thermal noise produced from the reference voltage section is held by the semiconductor switch and a capacitor and amplified by the inverting amplifier section to generate the physical random number.

4 Claims, 3 Drawing Sheets

US 7,979,481 B2

RANDOM NUMBER GENERATING CIRCUIT

This application claims priority under 35 U.S.C. §119 to Japanese Patent Application No. JP2006-228975 filed Aug. 25, 2006, the entire content of which is hereby incorporated by reference.

BACKGROUND OF THE INVENTION

1. Field of the Invention

The present invention relates to a random number generating circuit for generating a physical random number, and, for example, to a random number generating circuit suitable to generate a random number used to produce a code key required for security functions of an IC card, a stored-program one-chip microcomputer, and the like.

2. Description of the Related Art

A random number generating circuit used to secure an ID, a code key, or the like requires high randomness.

A random number is broadly divided into a physical random number generated based on a random phenomenon which occurs in nature and a pseudo random number which is artificially generated.

The pseudo random number is a random number artificially generated by a logic circuit or software. The pseudo random number is typically generated by, for example, a built-in random number circuit of a personal computer.

However, in the case of the pseudo random number, a random number generation procedure is determined by the logic circuit or the software. Therefore, when an initial system state is found, the random number can be relatively easily predicted, so there is a case where the security is incomplete.

On the other hand, the physical random number is normally assumed to be a cryptographically safe random number because of high randomness.

Examples of the physical random number include an electrical thermal noise of a resistor and a shot noise of a PN junction of a semiconductor.

A technique of sampling a thermal noise generated by a thermal noise element, storing the sampled thermal noise as a charge in a capacitor unit, amplifying a voltage corresponding to the charge stored in the capacitor unit, and converting the amplified voltage into a digital signal by A/D conversion to generate a random number is employed for the random number generating circuit using the physical random number (see, for example, JP 2001-175458 A).

The above-mentioned physical random number is generated based on a thermal noise or the like from a noise source. However, a noise level is slight (several tens $\mu V$ to several hundreds $\mu V$), so a high voltage is required to extract the thermal noise as an effective random number.

With an increase in density of circuits due to improvement of LSI functions, a reduction in manufacturing element size is being advanced. When the element size reduces, there is a problem in that an element withstand voltage reduces, thereby reducing a circuit withstand voltage.

In view of the security, it is necessary to incorporate the random number generating circuit in an LSI chip. However, the structure using the physical random number is used, so there are a large number of problems to be solved, which include a problem related to suitability as an LSI material.

In particular, the conventional random number generating circuit includes a large number of elements for realizing a specific structure of a noise amplifier serving as a unit for extracting a random noise component. Therefore, there arise problems in that an area of the LSI chip increases and a manufacturing cost increases.

SUMMARY OF THE INVENTION

The present invention has been made in view of the above-mentioned circumstances. An object of the present invention is to provide a random number generating circuit having a simple circuit structure, for producing a noise of a random phenomenon which is a source of a physical random number and detecting the noise to generate a random number.

In order to solve the above-mentioned problems, according to the present invention, there is provided a random number generating circuit including: a reference voltage section including: a first P-channel MOS transistor having a source which is connected with a power supply, and a gate and a drain which are connected with each other; and a first N-channel MOS transistor having a source which is grounded, and a gate and a drain which are connected with each other, the drain being connected with the drain of the first P-channel MOS transistor; an inverting amplifier section including: a second P-channel MOS transistor having a source which is connected with the power supply; and a second N-channel MOS transistor having a source which is grounded, a gate which is connected with a gate of the second P-channel MOS transistor, and a drain which is connected with the drain of the second P-channel MOS transistor; and a semiconductor switch having a first terminal which is connected with the drain of the first P-channel MOS transistor and a second terminal which is connected with the gate of the second P-channel MOS transistor.

In the random number generating circuit according the present invention, the reference voltage section has a reference voltage equal to a logic threshold voltage of the inverting amplifier section.

In the random number generating circuit according the present invention, the first P-channel MOS transistor and the second P-channel MOS transistor have transistor sizes equal to each other, and the first N-channel MOS transistor and the second N-channel MOS transistor have transistor sizes equal to each other.

In the random number generating circuit according the present invention, the semiconductor switch includes a transfer gate including a MOS transistor.

As described above, according to the present invention, the random number generating circuit has the structure for amplifying a very small noise produced from the reference voltage section by the inverting amplifier circuit. Therefore, a physical random number can be easily generated by a simple circuit, so the number of elements composing the random number generating circuit can be reduced to a value smaller than that of a related art. Thus, a chip size of an LSI having a random number generating function is reduced, with the result that a manufacturing cost can be reduced.

DETAILED DESCRIPTION OF THE PREFERRED EMBODIMENT

Figure 1:
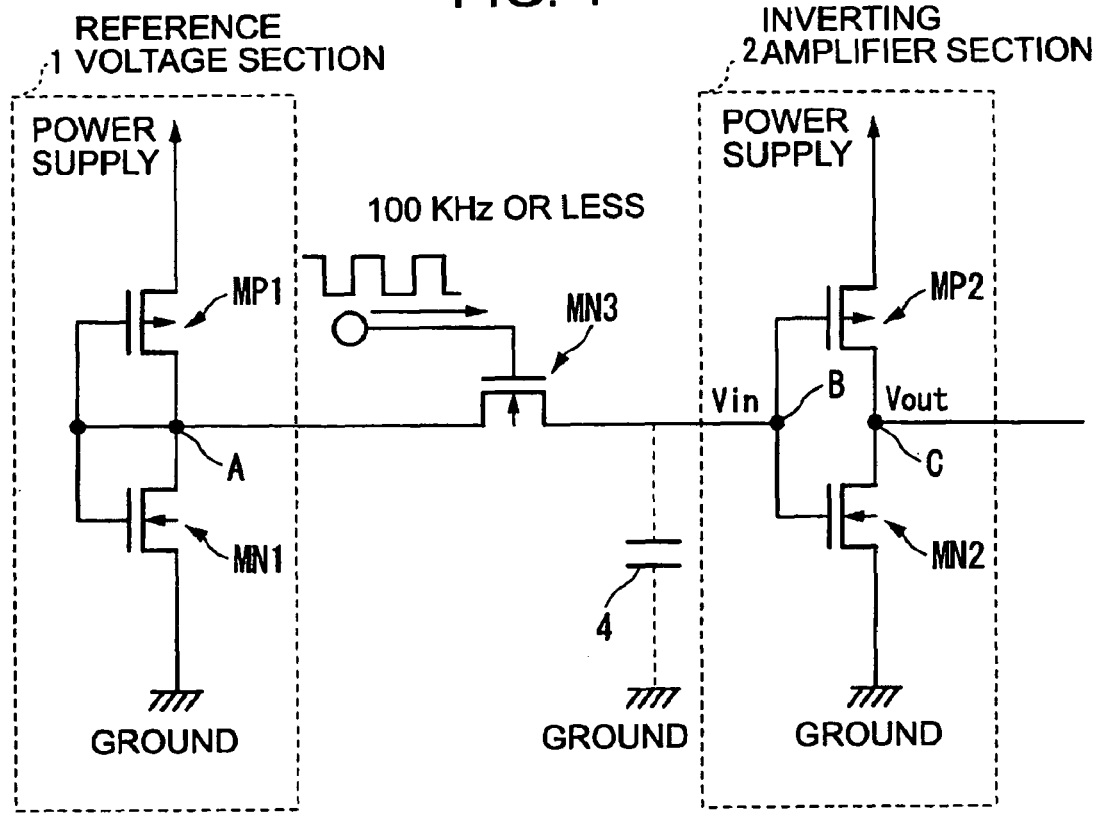
FIG. 1 shows a circuit structural example of a random number generating circuit according to an embodiment of the present invention.

Hereinafter, a random number generating circuit according to an embodiment of the present invention will be described with reference to the accompanying drawings. FIG. 1 is a block diagram showing a structural example of the random number generating circuit according to the embodiment of the present invention.

In FIG. 1, a reference voltage section 1 includes a P-channel MOS transistor MP1 and an N-channel MOS transistor MN1. A source of the P-channel MOS transistor MP1 is connected with a power supply and a gate thereof is connected with a drain thereof. A source of the N-channel MOS transistor MN1 is grounded, a gate thereof is connected with a drain thereof, and the drain is connected with the drain of the P-channel MOS transistor MP1.

An inverting amplifier section (inverter) 2 includes a P-channel MOS transistor MP2 and an N-channel MOS transistor MN2. A source of the P-channel MOS transistor MP2 is connected with a power supply and a drain thereof is connected with a drain of the N-channel MOS transistor MN2. A source of the N-channel MOS transistor MN2 is grounded, a gate thereof is connected with the gate of the P-channel MOS transistor MP2, and the drain thereof is connected with the drain of the P-channel MOS transistor MP2.

Transistor sizes of the P-channel MOS transistor MP1, the N-channel MOS transistor MN1, the P-channel MOS transistor MP2, and the N-channel MOS transistor MN2 are set such that a reference voltage level outputted from the reference voltage section 1 becomes equal to a logic threshold voltage (reference voltage level) of the inverting amplifier section 2.

In view of manufacturing variations, in order to make the reference voltage level of the reference voltage section 1 equal to the reference voltage level of the inverting amplifier section 2, the P-channel MOS transistors MP1 and MP2 are preferably set such that the transistor sizes thereof become equal to each other. In addition, the N-channel MOS transistors MN1 and MN2 are preferably set such that the transistor sizes thereof become equal to each other.

An N-channel MOS transistor MN3 is a transfer gate inserted between the reference voltage section 1 and the inverting amplifier section 2. A first terminal (any one of a drain or a source, for example, the drain) of the N-channel MOS transistor MN3 is connected with a connection point "A" between the drain of the P-channel MOS transistor MP1 and the drain of the N-channel MOS transistor MN1. A second terminal (another one of the drain or the source, for example, the source) of the N-channel MOS transistor MN3 is connected with a connection point "B" between the gate of the P-channel MOS transistor MP2 and the gate of the N-channel MOS transistor MN2.

The N-channel MOS transistor MN3 is on/off-controlled in response to a control signal inputted to a gate thereof. When the control signal is in an "H" level, that is, when the N-channel MOS transistor MN3 is in an on state, the reference voltage outputted from the reference voltage section 1 is transferred to the connection point "B" in the inverting amplifier section 2. On the other hand, when the control signal is in an "L" level, that is, when the N-channel MOS transistor MN3 is in an off state, a voltage value at the time of the off state is held in a capacitor 4.

The capacitor 4 to be provided may be a condenser. Alternatively, the capacitor 4 may be a parasitic capacitor which is a capacitor with a diffused layer of the second terminal of the N-channel MOS transistor MN3 or a capacitor with the respective gates of the P-channel MOS transistor MP2 and the N-channel MOS transistor MN2.

Figure 2:
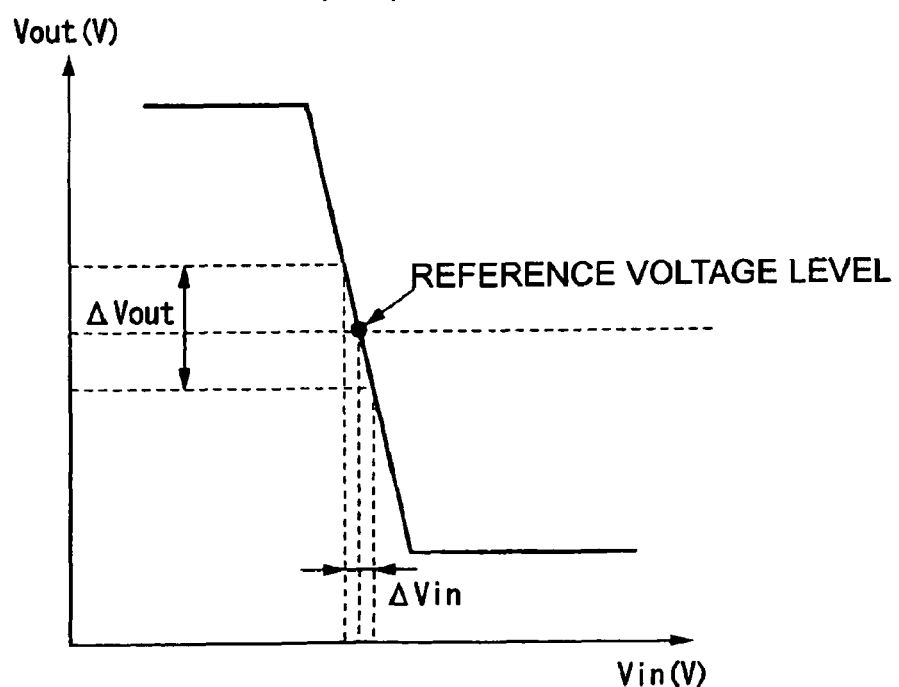
FIG. 2 is a graph showing a correspondence relationship between an input voltage (axis of abscissa) and an output voltage (axis of ordinate), which corresponds to an amplification characteristic of an inverting amplifier section (1) of FIG. 1.

Next, a relationship between an input voltage and an output voltage of the inverting amplifier section 2 shown in FIG. 1 will be described with reference to FIG. 2.

A reference voltage Vin is inputted from the reference voltage section 1 to the connection point "B" between the gate of the P-channel MOS transistor MP2 and the gate of the N-channel MOS transistor MN2 through the N-channel MOS transistor MN3. The reference voltage Vin is a value equal to the logic threshold voltage (reference voltage level) of the inverting amplifier section 2 and unstably and irregularly fluctuated by a very small voltage $\Delta$Vin (several tens $\mu$V to several hundreds $\mu$V) caused by a thermal noise. The reference voltage (level) Vin is the center of fluctuation of the very small voltage $\Delta$Vin, so an intermediate voltage between a voltage value of the power supply and a ground level value is normally set as the reference voltage.

In the inverting amplifier section 2, the inputted reference voltage Vin is equal to the reference voltage level thereof and thus is not amplified. The very small voltage $\Delta$Vin which is a fluctuation component from the reference voltage level is inversely amplified by a preset amplification factor (for example, several tens times to several hundreds times) and outputted as an amplified voltage $\Delta$Vout (several mV to several tens mV).

The very small voltage $\Delta$Vin is small and a frequency thereof is high (for example, 10 MHz), so the inverting amplifier section 2 cannot make a response, that is, the inverting amplifier section 2 cannot perform an inverting amplification operation.

Therefore, the N-channel MOS transistor MN3 is turned on by setting the control signal inputted to the gate thereof to the "H" level. Then, charges are stored in the capacitor 4 located at the connection point "B" or discharged therefrom to supply the voltage value at the connection point "A". After that, the control signal is set to the "L" level to turn off the N-channel MOS transistor MN3, so the very small voltage $\Delta$Vin at this time is sampled on the capacitor 4. It is desirable to use a low frequency (for example, a frequency equal to or larger than 1 Hz and equal to or smaller than 100 kHz) as a sampling period in view of a response speed to a very small voltage, of each of the MOS transistors of the inverting amplifier section 2.

Then, the inverting amplifier section 2 performs the inverting amplification operation on a voltage corresponding to the charges stored in the capacitor 4.

Figure 3:
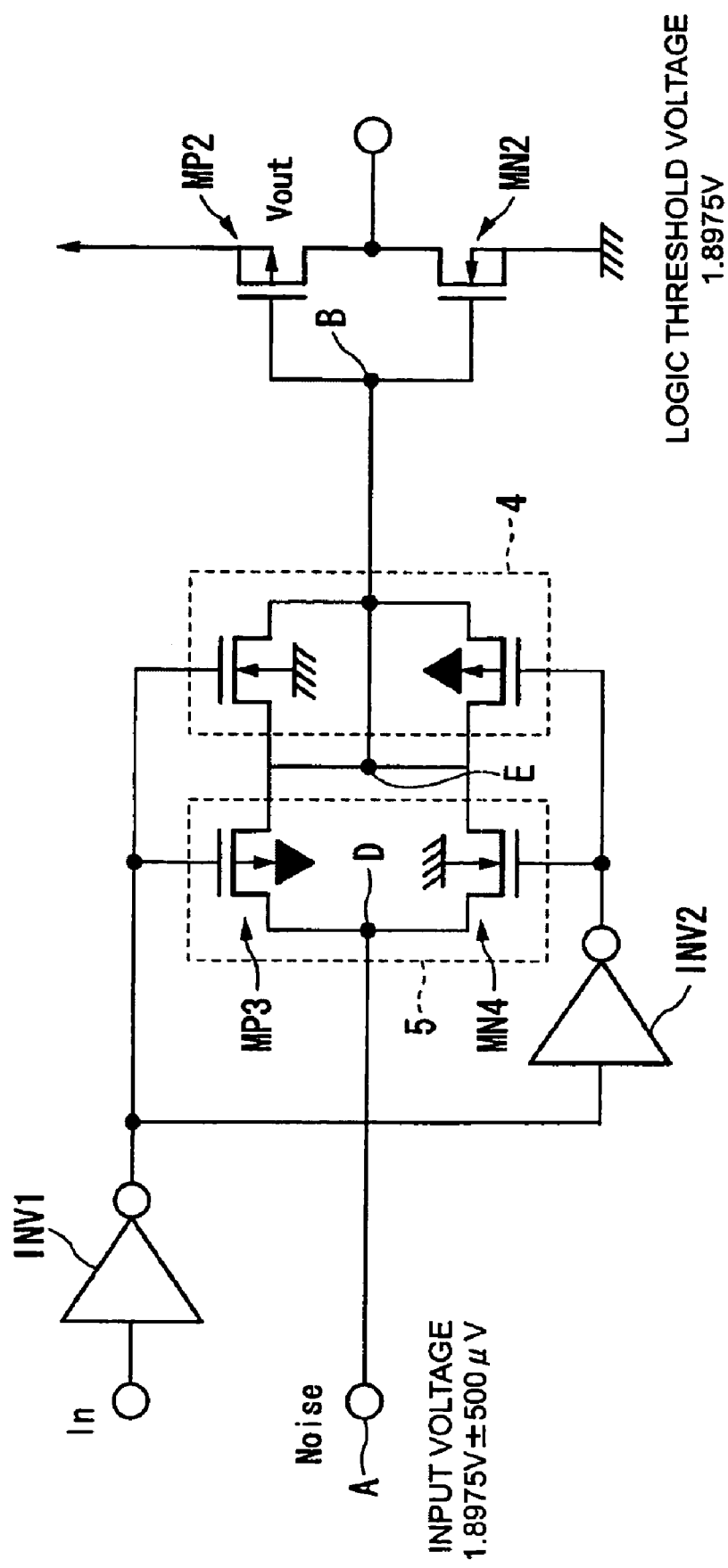
FIG. 3 shows a circuit structure of the random number generating circuit of FIG. 1, which is used for simulation.
Figure 4:
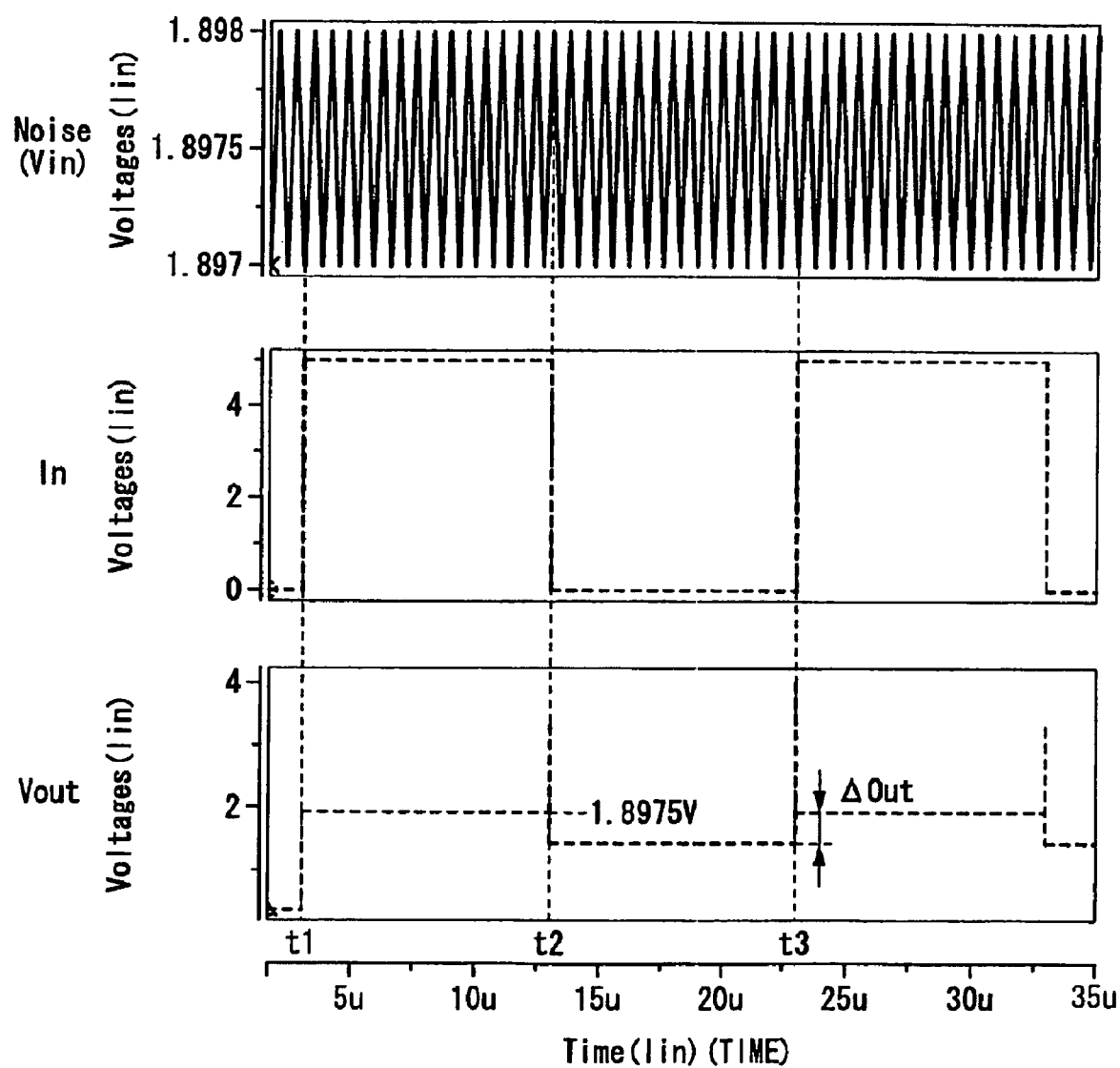
FIG. 4 is a waveform diagram showing a result obtained by simulation using the random number generating circuit of FIG. 3.

Next, the operation of the random number generating circuit shown in FIG. 1 will be described with reference to FIGS. 3 and 4. FIG. 3 shows a structure of a circuit used for simulation. FIG. 4 is a waveform diagram showing a result obtained by the simulation. The axis of abscissa indicates a time and the axis of ordinate indicates a voltage level. HSPICE (registered trademark) simulator is used.

In the circuit used for the simulation as shown in FIG. 3, a bidirectional transfer gate 5 including an N-channel MOS transistor MN4 and a P-channel MOS transistor MP3 is used instead of the N-channel MOS transistor MN3 which is the transfer gate as shown in FIG. 1. A source of the P-channel MOS transistor MP3 and a drain of the N-channel MOS transistor MN4 are connected with each other at a connection point "D". A drain of the P-channel MOS transistor MP3 and a source of the N-channel MOS transistor MN4 are connected with each other at a connection point "E".

The capacitor 4 including MOS transistors is connected with the connection point "E". The connection point "E" is connected with the connection point "B" in the inverting amplifier section 2.

The connection point "D" in the bidirectional transfer gate 5 is connected with the connection point "A" in the reference voltage section 1 which is not shown in FIG. 3. That is, the connection point "D" which is one terminal of the bidirectional transfer gate 5 is connected with the connection point "A" which is an output terminal of the reference voltage section 1. The connection point "E" which is the other terminal of the bidirectional transfer gate 5 is connected with the connection point "B" which is an input terminal of the inverting amplifier section 2.

A NOISE signal is a triangular wave train signal whose reference voltage (input voltage) Vin is 1.8975 V and very small voltage ΔVin is ±500 μV. The NOISE signal is inputted from a signal source of the simulator to the connection point "E" in the bidirectional transfer gate 5. At this time, the logic threshold voltage of the inverting amplifier section 2 is also set to 1.8975 V which is equal to the reference voltage Vin.

A control signal In for controlling the turning on/off of the bidirectional transfer gate 5 is applied to a gate of the P-channel MOS transistor MP3 and a gate of the N-channel MOS transistor MN4 through inverters INV1 and INV2.

When the control signal In is in an "H" level, an "L" level signal is applied to the gate of the P-channel MOS transistor MP3 through the inverter INV1 and an "H" level signal is applied to the gate of the N-channel MOS transistor MN4 through the inverters INV1 and INV2. Then, the bidirectional transfer gate 5 becomes an electrical connection state (on state).

On the other hand, when the control signal In is in an "L" level, the "H" level signal is applied to the gate of the P-channel MOS transistor MP3 through the inverter INV1 and the "L" level signal is applied to the gate of the N-channel MOS transistor MN4 through the inverters INV1 and INV2. Then, the bidirectional transfer gate 5 becomes an electrical disconnection state (off state).

Next, the operation of the random number generating circuit will be described with reference to FIG. 4.

A waveform located on an upper portion of FIG. 4 corresponds to a waveform of the reference voltage from the connection point "A" in which the very small voltage ΔVin is fluctuated. The reference voltage Vin is 1.8975 V. The very small voltage ΔVin which is fluctuated by ±500 μV with respect to the reference voltage level is superimposed on the reference voltage as a rectangular wave pulse train whose frequency is 1.5 MHz.

The control signal In located on a middle portion of FIG. 4 is inputted as a 50%-duty pulse train whose period is 20 μseconds, that is, whose frequency is 50 Hz ("H" level is 5.0 V, "L" level is ground voltage (0 V)).

A signal Out located on a lower portion of FIG. 4 shows an output voltage level of the inverting amplifier section 2 which corresponds to a result obtained by the inverting amplification of the voltage stored in the capacitor 4.

At a time t1, the control signal In is changed from the "L" level to the "H" level. Then, the bidirectional transfer gate 5 becomes the on state. Therefore, the reference voltage Vin in which the very small voltage ΔVin is fluctuated is applied to the capacitor 4 and the connection point "B".

At this time, a fluctuation frequency of the very small voltage ΔVin is faster than a response speed of the inverting amplifier section 2, so the voltage Vout outputted from the inverting amplifier section 2 has 1.8975 V which is the reference voltage level.

At a time t2, the control signal In is changed from the "H" level to the "L" level. Then, the bidirectional transfer gate 5 becomes the off state. Therefore, the reference voltage Vin in which the very small voltage ΔVin is fluctuated is not applied to the capacitor 4 and the connection point "B", so the voltage level applied to the capacitor 4 at the time of change to the "L" level is held.

After that, the inverting amplifier section 2 amplifies the voltage stored in the capacitor 4 and outputs the amplified voltage as the output voltage Vout.

At this time, the inverting amplifier section 2 amplifies the very small voltage ΔVin stored in the capacitor 4 without depending on the response speed. Therefore, the voltage Vout outputted from the inverting amplifier section 2 is a voltage obtained by superimposing the voltage Vout (approximately 100 mV) on the reference voltage level (1.8975 V).

At a time t3, the control signal In is changed from the "L" level to the "H" level. Then, the bidirectional transfer gate 5 becomes the on state. Therefore, the reference voltage Vin in which the very small voltage ΔVin is fluctuated is applied to the capacitor 4 and the connection point "B".

At this time, the fluctuation frequency of the very small voltage ΔVin is faster than the response speed of the inverting amplifier section 2, so the voltage Vout outputted from the inverting amplifier section 2 has 1.8975 V which is the reference voltage level.

The above-mentioned processing is repeated due to the change of the control signal In between the "H" level and the "L" level. Therefore, the output voltage Vout used as a random number can be extracted while the bidirectional transfer gate 5 is in the off state.

After that, the output voltage Vout is subjected to A/D conversion without any processing. An obtained bit string may be used as the random number. The output voltage Vout may be extracted through a filter, amplified, and then subjected to A/D conversion to use an obtained bit string as the random number.

According to the structure in this embodiment, the random number generating circuit for obtaining the physical random number based on the very small voltage caused by the thermal noise can be realized using a simple circuit which includes the reference voltage section 1 having a single CMOS inverter and the inverting amplifier section 2 having a single CMOS inverter. Therefore, as compared with a conventional example, a circuit area can be reduced and a manufacturing cost of a chip in which the random number generating circuit is provided can be reduced.

What is claimed is:
1. A random number generating circuit, comprising:
   a reference voltage section consisting of:
      a first P-channel MOS transistor having a source connected with a power supply, and a gate and a drain connected with each other; and
      a first N-channel MOS transistor having a source grounded, and a gate and a drain which are connected with each other, the drain being connected with the drain of the first P-channel MOS transistor;
   an inverting amplifier section consisting of:
      a second P-channel MOS transistor having a source connected with the power supply; and
      a second N-channel MOS transistor having a grounded source, a gate connected with a gate of the second P-channel MOS transistor, and a drain connected with a drain of the second P-channel MOS transistor, wherein the drain of the second P-channel MOS transistor outputs the generated random number; and a semiconductor switch operating at a frequency compatible with the response speed of the inverting amplifier section, the switch including a first terminal connected with the drain of the first P-channel MOS transistor and a second terminal connected with the gate of the second P-channel MOS transistor, and further including a capacitor coupled to the second terminal and storing a sampling voltage, such that the sampling voltage is provided to the inverting amplifier section.

2. A random number generating circuit according to claim 1, wherein the reference voltage section has a reference voltage equal to a logic threshold voltage of the inverting amplifier section.

3. A random number generating circuit according to claim 1, wherein: the first P-channel MOS transistor and the second P-channel MOS transistor have transistor sizes equal to each other; and the first N-channel MOS transistor and the second N-channel MOS transistor have transistor sizes equal to each other.

4. A random number generating circuit according to claim 1, wherein the semiconductor switch comprises a transfer gate including a MOS transistor, and wherein the MOS transistor is sized such that the on/off state of the MOS transistor is responsive to a signal frequency of less than 100 kHz.

* * * * *